United States Patent [19]
Kosako et al.

[11] Patent Number: 5,740,477
[45] Date of Patent: Apr. 14, 1998

[54] MULTI-POINT OBJECT DISTANCE MEASURING DEVICE

[75] Inventors: Kosei Kosako; Takuma Sato, both of Tokyo, Japan

[73] Assignee: Asahi Kogaku Kogyo Kabushiki Kaisha, Tokyo, Japan

[21] Appl. No.: 798,339

[22] Filed: Feb. 10, 1997

Related U.S. Application Data

[63] Continuation of Ser. No. 421,924, Apr. 14, 1995, abandoned.

[30] Foreign Application Priority Data

Apr. 15, 1994 [JP] Japan ................................ 6-077357

[51] Int. Cl.$^6$ ............................ G03B 13/34; G03B 13/00
[52] U.S. Cl. ..................... 396/101; 396/111; 396/121
[58] Field of Search ........................ 396/101, 89, 121, 396/111; 250/201.2–201.8

[56] References Cited

U.S. PATENT DOCUMENTS

| | | |
|---|---|---|
| Re. 34,900 | 4/1995 | Mogamiya et al. . |
| 3,177,762 | 4/1965 | Ito . |
| 3,741,088 | 6/1973 | Nobusawa . |
| 4,529,287 | 7/1985 | Karasaki et al. ................ 354/406 |
| 4,860,045 | 8/1989 | Hamada et al. ................ 354/402 |
| 4,883,955 | 11/1989 | Kawasaki et al. . |
| 4,949,116 | 8/1990 | Karasaki et al. ................ 354/408 |
| 4,977,311 | 12/1990 | Kusaka et al. .................. 250/208.1 |
| 5,021,818 | 6/1991 | Satoh et al. . |
| 5,051,767 | 9/1991 | Honma et al. . |
| 5,247,327 | 9/1993 | Suzuka et al. . |
| 5,274,429 | 12/1993 | Misawa et al. . |
| 5,278,602 | 1/1994 | Honma et al. . |
| 5,289,225 | 2/1994 | Hirai . |
| 5,307,111 | 4/1994 | Kurei . |
| 5,519,203 | 5/1996 | Kusaka et al. .................. 250/208.1 |

*Primary Examiner*—Safet Metjahic
*Assistant Examiner*—Eric Nelson
*Attorney, Agent, or Firm*—Greenblum & Bernstein, P.L.C.

[57] ABSTRACT

A multi-point object distance measuring device which includes a plurality of object distance measuring areas, and a detecting device for detecting the amounts of defocus or distances of objects in the plurality of object distance measuring areas. The plurality of object distance measuring areas are disposed in a manner such that at least two object distance measuring areas of the plurality of object distance measuring areas partially overlap each other.

21 Claims, 6 Drawing Sheets

MULTI-POINT OBJECT DISTANCE MEASURING DEVICE

This application is a continuation of application Ser. No. 08/421,924, filed Apr. 14, 1995, now abandoned.

BACKGROUND OF THE INVENTION

1. Field of the Invention

The present invention relates to a multi-point object distance measuring device which measures distances or the amounts of defocus of an object or objects in a plurality of measuring zones.

2. Description of Related Art

Recently, a multi-point object distance measuring device for an automatic focusing camera has been developed. The multi-point object distance measuring device can measure distances of an object (or objects) in a plurality of measuring zones (i.e., measuring areas') or the amount of defocus of a photographing lens for the object or objects in their measuring zones.

In a conventional multi-point distance measuring device, a plurality of measuring zones are separated from another. FIGS. 10 and 11 each show the positional relationship among separately-formed measuring zones, an image area and an object image in a conventional multi-point distance measuring device having three measuring zones 63a, 63b, 63c. In FIG. 10 a tree 71 is seen in the image area 61. In FIG. 11 a person 73 is in image area 61. As can be seen from these figures, the measuring zones 63a, 63b, 63c are separated, from one another. For this arrangement, the distance of an object which falls between measuring zones, i.e., between the measuring zones 63b and 63a or between the measuring zones 63a and 63c, is not measured. For example FIG. 10, the distance of tree 71 is not measured since the tree 71 is positioned in the image area 61 between the measuring zones 63b and 63a.

In the case of a passive-type multi-point object distance measuring device, the distance of an object of low contrast cannot be precisely measured under many circumstances. For example, in the case shown in FIG. 11, i.e., in the case where the person 73 is in a backlit condition, the person 73 covers the central measuring zone 63a, and the outline of the person 73 is positioned between the measuring zones 63b and 63a and between the measuring zones 63a and 63c. The amount of defocus therefore cannot be measured since the contrast of the person 73 in the center measuring zone 63a is quite low, making it impossible to bring the person 73 into focus.

In the above illustration, where the distance measuring device cannot measure the amount of defocus, it is possible to take a picture with a so-called focus-lock technique for bringing the main object into focus. However, it is especially difficult for beginners to take a picture using the focus-lock technique.

SUMMARY OF THE INVENTION

The primary object of the present invention is to provide a multi-point object distance measuring device which is highly flexible and has a wider measurement range compared to conventional devices.

To achieve the object mentioned above, according to the present invention, there is provided a multi-point object distance measuring device which includes a plurality of object distance measuring areas. A detecting mechanism detects the amounts of defocus or distances of objects in the plurality of object distance measuring areas. The plurality of object distance measuring areas are disposed in a manner such that at least two object distance measuring areas of the plurality of object distance measuring areas partially overlap each other.

Preferably, the plurality of object distance measuring areas are aligned.

In a feature of the present invention, the multi-point object distance measuring device also includes: a pair of image sensors; a pair of optical elements, each forming an object image corresponding to the plurality of object distance measuring areas upon the pair of image sensors; a pair of sensor areas formed on the pair of image sensors for each of the plurality of object distance measuring areas; and a calculating mechanism for calculating a phase difference of image data obtained by photoelectric-converting object images formed on the pair of sensor areas.

The pair of image sensors each have a line sensor including a plurality of photoelectric-converting elements aligned at predetermined intervals.

Image data calculated by each of the plurality of photoelectric-converting elements outputs from the respective line sensors, element by element, from one end of the line sensor to the other end.

The detecting means also includes a memory for storing image data output from the pair of image sensors. The detecting mechanism detects an amount of defocus or distances of objects in the plurality of object distance measuring areas by outputting image data formed in the sensor areas from the memory.

The detecting mechanism detects the amount of defocus or a distance of an object in one of the plurality of object distance measuring areas by using image data formed in the pair of sensor areas corresponding to the one of the plurality of object distance measuring areas, The image data is part of the image data output from the pair of image sensors.

The detecting mechanism detects an amount of defocus or distances of objects in the plurality of object distance measuring areas, area by area, by using image data formed in the pair of sensor areas. The image data is part of the image data output from the pair of image sensors.

The multi-point object distance measuring device also preferably includes: a pair of sensor areas provided for each of the plurality of object distance measuring areas; a mechanism for forming an object image corresponding to the respective object distance measuring areas upon each of the pair of sensor areas; and a mechanism for calculating a phase difference of object images formed on the pair of sensor areas. Preferably, the pair of sensor areas are formed on a pair of image sensors.

According to another aspect of the present invention, there is provided a multi-point object distance measuring device which includes: a plurality of object distance measuring areas; a pair of line sensors each corresponding to the plurality of object distance measuring as and each including a plurality of photoelectric-converting elements; and a detecting mechanism for detecting an amount of defocus or distances of objects in the plurality of object distance measuring areas by using image data output from the pair of line sensors, wherein some of the plurality of photoelectric-converting elements are disposed in more than one of the plurality of object distance measuring areas.

The present disclosure relates to subject matter contained in Japanese patent application No. 06-77357 (filed on Apr. 15, 1994) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
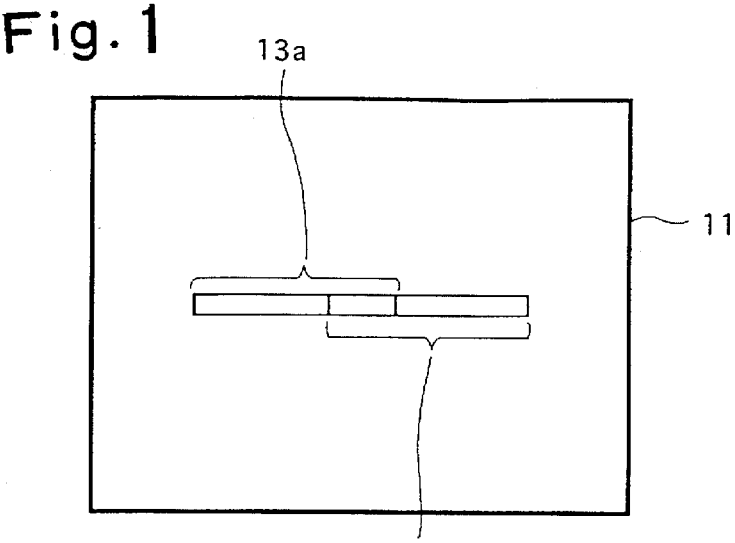
FIG. 1 is an illustration showing the arrangement of two measuring zones, with respect to an image area, of a multi-point object distance measuring device to which the present invention is applied, according to the first embodiment of the present invention.
Figure 2:
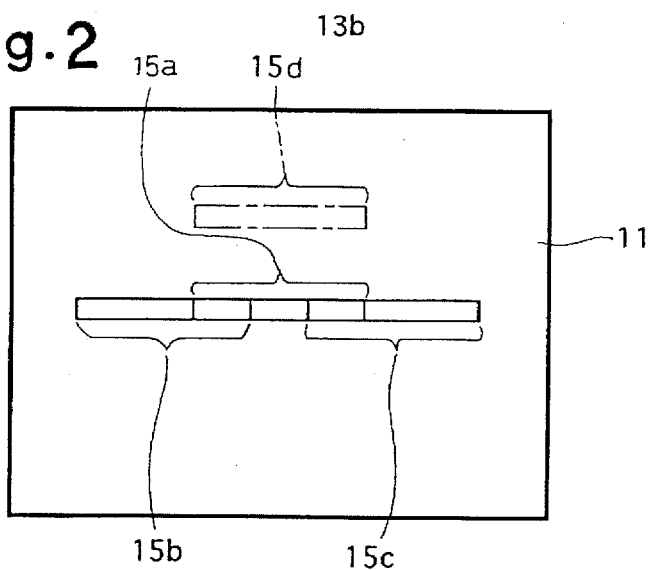
FIG. 2 is an illustration showing the arrangement of three measuring zones, with respect to an image area, of a multi-point object distance measuring device to which the present invention is applied, according to the second embodiment of the present invention.
Figure 3:
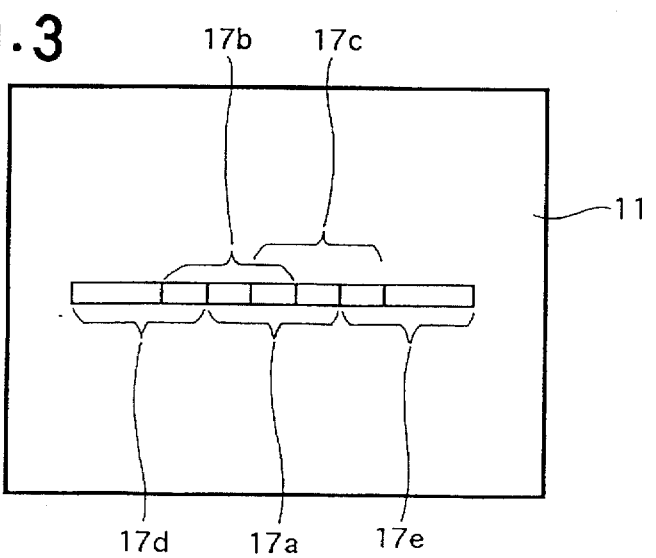
FIG. 3 is an illustration showing the arrangement of five measuring zones, with respect to an image area, of a multi-point object distance measuring device to which the present invention is applied, according to the third embodiment of the present invention.

FIG. 1 is an illustration showing the arrangement of two measuring zones 13a and 13b, with respect to an image area 11, of a multi-point object distance measuring device to which the present invention is applied, according to a first embodiment of the present invention. FIG. 2 is an illustration showing the arrangement of three measuring zones 15a, 15b and 15c, with respect to the image area 11, of a multi-point object distance measuring device to which the present invention is applied, according to a second embodiment of the present invention. FIG. 3 is an illustration showing the arrangement of five measuring zones 17a, 17b, 17c, 17d and 17e, with respect to the image area 11, of a multi-point object distance measuring device to which the present invention is directed, according to a third embodiment of the present invention.

In the first embodiment shown in FIG. 1, the measuring zones 13a and 13b are placed substantially along the central horizontal line in the image area 11, symmetrically with respect to the center of the image area 11, and overlap each other by one third in width.

Similarly, in the second embodiment shown in FIG. 2, the measuring zones 15a, 15b and 15c are placed substantially along the central horizontal line in the image area 11, and symmetrically with respect to the center of the image area 11. Adjacent measuring zones overlap each other by one third in width, with the measuring zone 15a placed substantially in the center of the image area 11.

Furthermore, in the third embodiment shown in FIG. 3, the measuring zones 17a, 17b, 17c, 17d and 17e are are placed substantially along the central horizontal line in the image area 11 and symmetrically with respect to the center of the image area 11. Adjacent measuring zones overlap each other by one third in width, with the measuring zone 17a placed substantially in the center of the image area 11.

The present invention is not limited to the number, shape, arrangement, overlapping amount of the measuring zones shown in FIGS. 1 through 3, and those seen in FIGS. 1 through 3 are merely examples.

Figure 4:
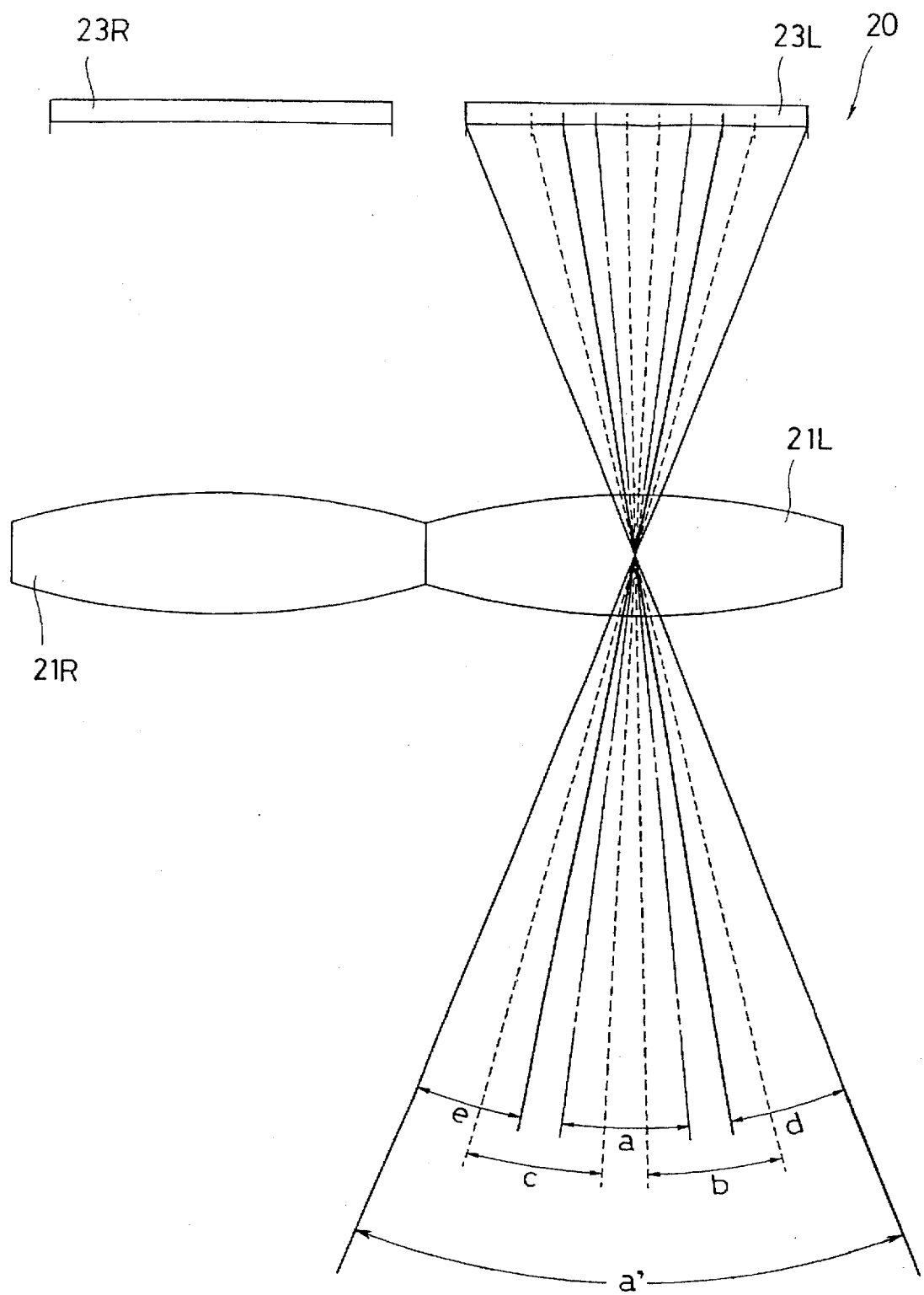
FIG. 4 is a schematic plane view of an AF sensor unit to which the present invention is applied.
Figure 5:
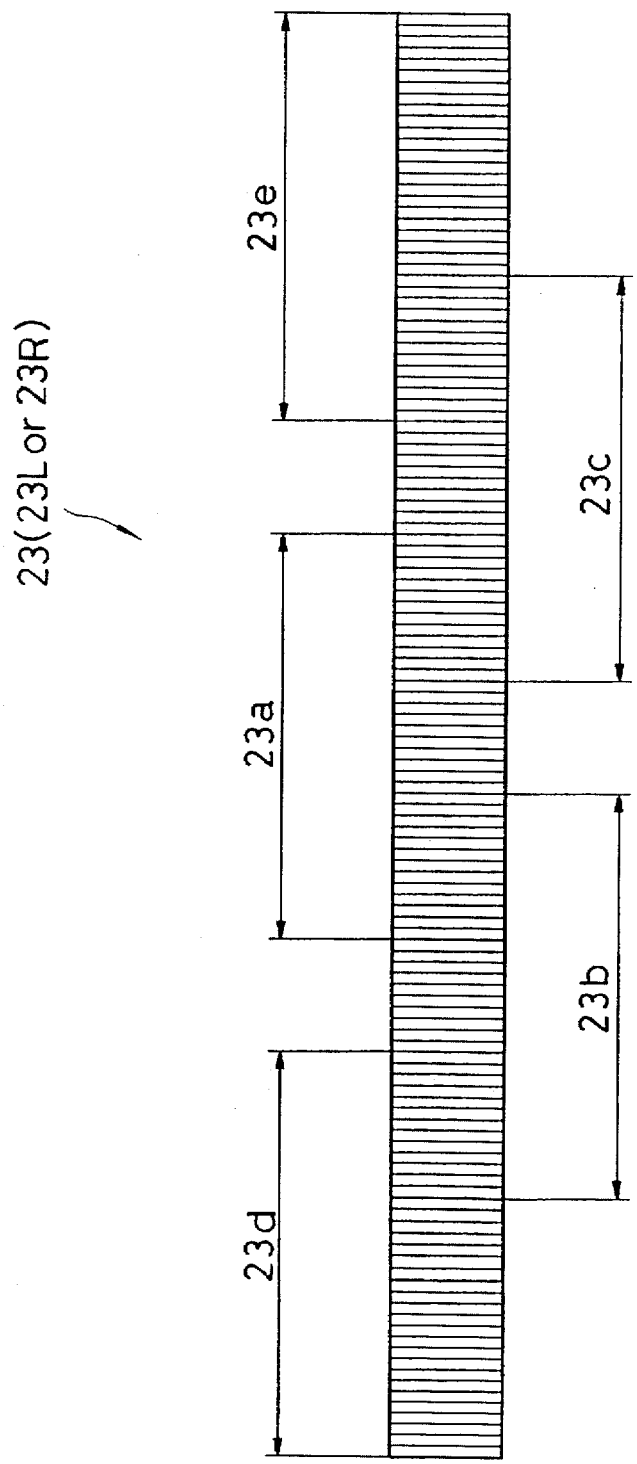
FIG. 5 is a schematic plane view of a line sensor of the AF sensor unit shown in FIG. 4, showing the disposition of the sensor areas of the line sensor.
Figure 6:
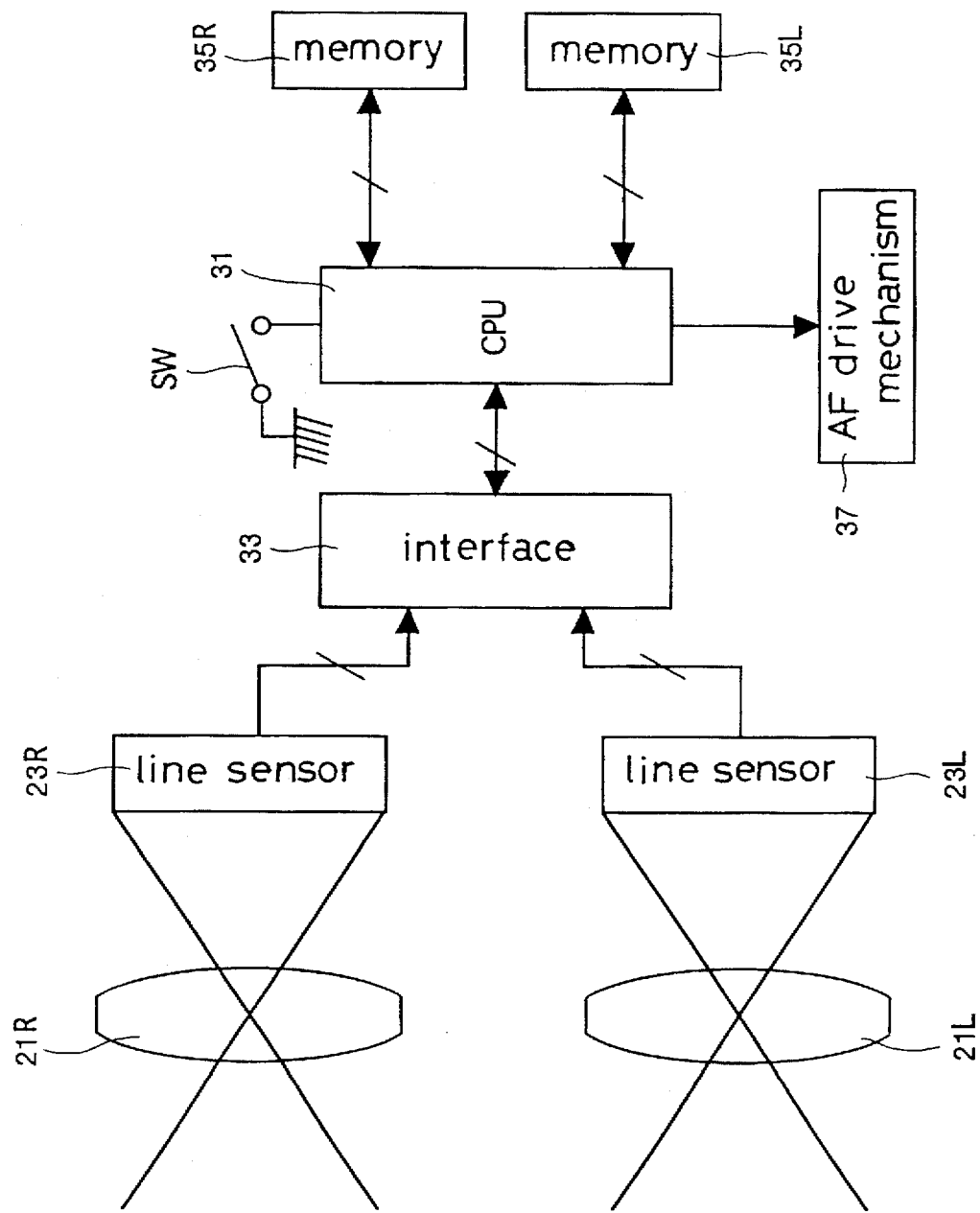
FIG. 6 is a block diagram showing the structure of circuitry of a multi-point object distance measuring device including the AF sensor unit shown in FIG. 4.
Figure 7:
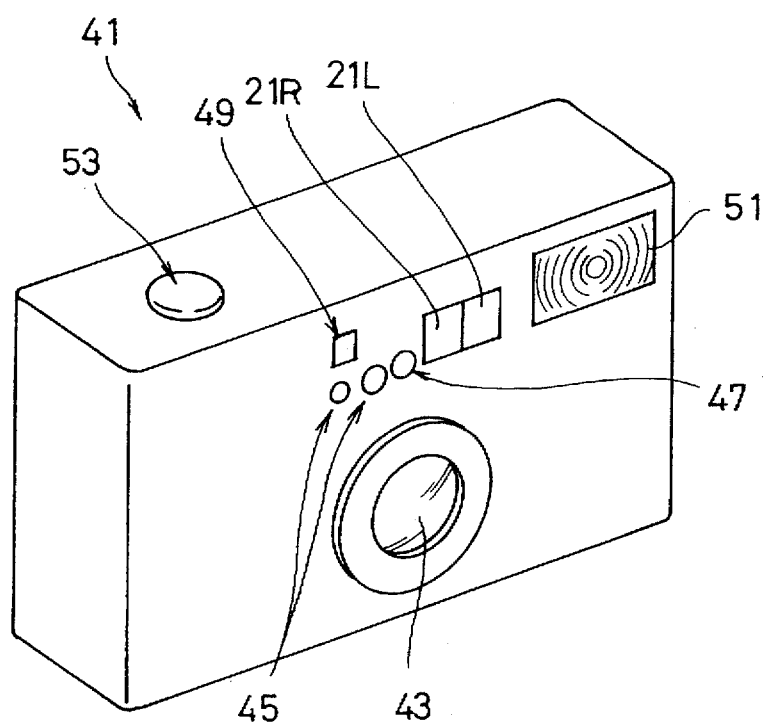
FIG. 7 is a perspective view of a lens shutter type camera including the multi-point object distance measuring device shown in FIG. 6.

The concrete construction of an object distance measuring means which measures distances of an object or objects in the above-noted plurality of measuring zones is explained below with reference to FIGS. 4 through 7. FIG. 4 shows a schematic view of an AF sensor unit to which the present invention is applied. FIG. 5 shows an expanded view of a line sensor of the AF sensor unit shown in FIG. 4. FIG. 6 shows a block diagram showing the circuitry construction of the multi-point object distance measuring device including the AF sensor unit shown in FIG. 4. FIG. 7 shows a perspective view of a lens shutter type camera provided with the multi-point object distance measuring device of the present invention.

An AF sensor unit 20 adopts a so-called phase difference detecting method, including an image-forming lens group 21 as an optical system and a line sensor 23 as an image sensor. The image-forming lens group 21 consists of a pair of image-forming lenses 21L and 21R. The line sensor 23, which receives light of the object image formed by the image-forming lenses 21L and 21R, also consists of a pair of line sensors 23L and 23R. The image-forming lenses 21L and 21R and the line sensors 23L and 23R bring an object at a predetermined distance into focus. The image-forming lens 21L and line sensor 23L are constructed the same as the image-forming lens 21R and line sensor 23R, and the image-forming lenses 21L and 21R are formed as a single unit with the optical axes of the image-forming lenses 21L and 21R disposed parallel to each other. The image-forming lenses 21L and 21R are each directed to a common point on an object which corresponds to the measuring zones, and the common object image is thus formed on each of the line sensors 23L and 23R. A lens shutter type camera 41 (FIG. 7) is provided with the AF sensor unit 20 with the optical axes of the image-forming lenses 21L and 21R disposed parallel to the optical axis of a photographing lens 43 of the camera 41. Alternatively, the optical axes of the image-forming lenses 21L and 21R may be placed so as to intersect the optical axis of the photographing lens 43 at a specific distance for the purpose of parallax correction.

The AF sensor unit 20 can be arranged to correspond to any of the measuring zones 13(13a and 13b), 15(15a, 15b and 15c) and 17(17a, 17b, 17c, 17d and 17e). However, in the embodiment shown in FIGS. 4, the AF sensor 20 is arranged to correspond to the measuring zones 17 shown in FIG. 3, i.e., the measuring zones 17a, 17b, 17c, 17d and 17e. The five different ranges a, b, c, d and e shown in FIG. 4 correspond to the measuring zones 17a, 17b, 17c, 17d and 17e, respectively.

As shown in FIG. 5, the line sensor 23 (23L or 23R) is a CCD line sensor including a plurality of photoelectric transducers formed on a common circuit board at predetermined regular intervals. In the preferred embodiment of the present invention, one-hundred and twenty eight (128) photoelectric transducers are formed on a common circuit board forming the line sensor 23. The line sensors 23 are provided with sensor areas 23a, 23b, 23c, 23d and 23e which correspond to the measuring zones 17a, 17b, 17c, 17d and 17e, respectively. Each of the sensor areas 23a, 23b, 23c, 23d and 23e includes thirty-six (36) photoelectric transducers in the embodiment of the preferred present invention. The number of all photoelectric transducers, the number of photoelectric transducers apportioned to each sensor area 23a, 23b, 23c, 23d or 23e, may be different from those of the present embodiment. In addition, the line sensor 23 need not be a CCD line sensor, but can be different types of line sensors.

As shown in FIG. 6, the object image data (electric charge stored after photoelectric transduction) obtained through an integral calculation by each photoelectric transducer is output independently, one-by-one, from one end of the line sensor 23 to the other through an interface 33, converted to digital signals, and input to a CPU (microcomputer) 31 provided as a means for detecting an object distance or the amount of defocus. The CPU 31 writes the input digital signals in the respective memories 35L and 35R. The memories 35L and 35R are typically formed from a single RAM.

When the write operation of the input digital signals in the respective memories 35L and 35R finishes, the CPU 31 outputs, in order, the data of the sensor areas 23a through 23e of the line sensors 23L and 23R, and then detects a defocus amount or an object distance for each corresponding sensor area of the line sensors 23L and 23R. Specifically, the phase difference of a pair of images formed on the sensor areas 23a, 23b, 23c, 23d or 23e of the line sensors 23L and 23R is calculated in accordance with a predicate calculus or the like data, including distance or defocus data necessary for performing the focusing operation, is calculated or detected based on the calculated phase difference.

After object distance and/or the amount of defocus as to all the measuring zones 17a, 17b, 17c, 17d and 17e are calculated, the object distance and/or the defocus amount which corresponds to the distance closest to the camera is selected in the AF mode. This AF mode is either selected by the photographer or preset in the CPU 31. Thereafter, an AF drive mechanism 37 is activated to carry out a focusing operation in accordance with the selected object distance or the defocus amount.

FIG. 7 shows the lens shutter type camera 41 provided with the AF sensor unit 20 to which the present invention is directed. The camera 41 is provided on its front with the photographing lens 43. The camera 41 is further provided on its front wall above the photographing lens 43 with two window portions 45 for photometering, a window portion 47 for emitting auxiliary light, and a viewfinder window 49. The camera 41 is further provided on its front wall with the image-forming lenses 21L and 21R of the AF sensor unit 20 aligned along the horizontal direction of the camera 41.

The camera 41 is provided on its front with a strobe window 51 on its upper wall a shutter release button 53 on the top of camera 41. The release button 53 is correlated with a photometering switch (not shown) and a shutter release switch (not shown), so that the photometering switch is turned ON when the release button 53 is depressed halfway and that the shutter release switch is turned ON when the release button 53 is depressed fully. The CPU 31 carries out object distance and/or defocus amount calculating or detecting operation when the photometering switch is turned ON. The focusing operation, in which the AF drive mechanism 37 is activated in accordance with the detected object distance or defocus amount commences when the shutter release switch is turned ON, and the exposure operation in which a shutter/diaphragm unit (not shown) is activated.

Figure 8:
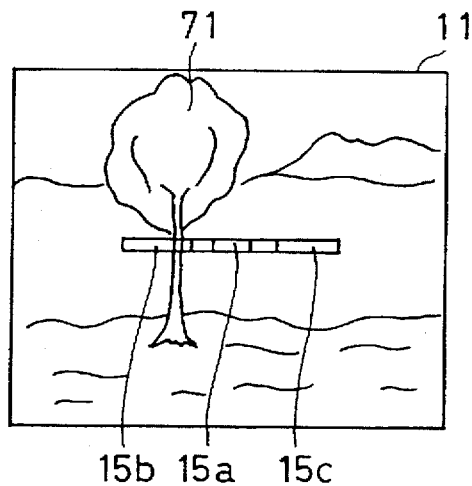
FIG. 8 is an illustration showing the positional relationship among an image area, measuring zones and a tree as the main photographing image in the case of the multi-point object distance measuring device of the second embodiment shown in FIG. 2.
Figure 9:
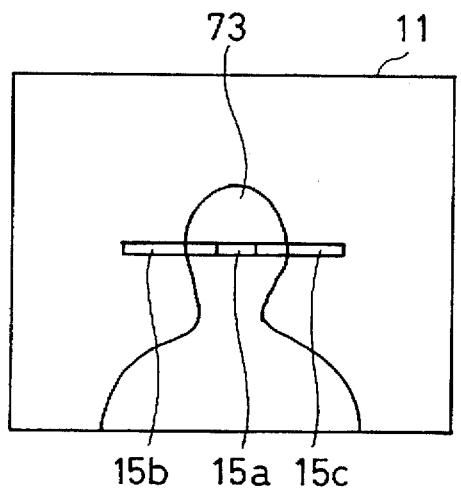
FIG. 9 is an illustration showing the positional relationship among an image area, measuring zones and a person as the main photographing image in the case of the multi-point object distance measuring device of the second embodiment shown in FIG. 2.

FIGS. 8 and 9 are illustrations showing the positional relationship among an image area, measuring zones and a photographing object in the case of the multi-point object distance measuring device of the second embodiment shown in FIG. 2. The tree 71 is seen in the image area 11 shown in FIG. 8, as is the person 73 in FIG. 9. In FIGS. 8 and 9, the multi-point object distance measuring device is provided with the measuring zones 15a, 15b and 15c corresponding to those shown in FIG. 2. When taking a picture of the scene, including the tree 71 shown in FIG. 8, the trunk of the tree 71 is positioned on one of the measuring zones, i.e., the measuring zone 15b, since the adjacent measuring zones 15a, 15b and 15a, 15c overlap one another without having any space therebetween. Using this arrangement, the object distance and/or the defocus amount of the tree 71 is detected.

Figure 10:
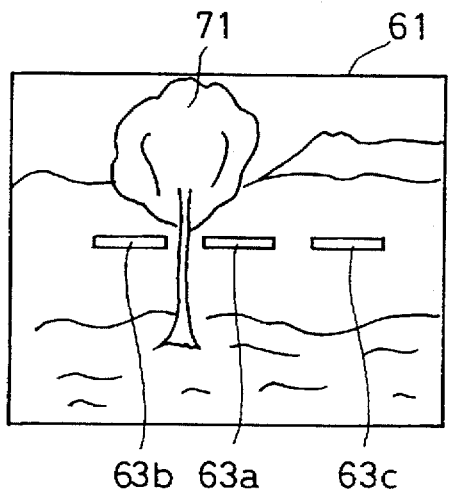
FIG. 10 is an illustration showing the positional relationship among an image area, measuring zones and a tree as the main photographing image in the case of a conventional multi-point object distance measuring device; and, FIG. 11 is an illustration showing the positional relationship among an image area, measuring zones and a person as the main photographing image in the case of a conventional multi-point object distance measuring device.

In a conventional AF camera, as noted above with reference to FIG. 10, the object distance or the defocus amount of the tree 71 is not detected where the trunk of the tree 71 is positioned between the measuring zones 63a and 63b. In this case, the object distance or the defocus amount of an object or objects situated far away from the tree 71 are detected on each of the measuring zones 63a, 63b and 63c. Consequently, the camera focuses on these distant objects, while the tree 71 appears blurry in the picture.

When taking a picture of the person 73 in a backlit condition as shown in FIG. 9, the outline of the person 73 is positioned is the measuring zones 15a, 15b and 15c, The outline of the person 73 is thus not positioned out of any of the measuring zones 15a, 15b and 15, and the object distance and/or defocus amount of the person 73 can be detected by detecting the variation of the brightness in the outline portion.

Figure 11:
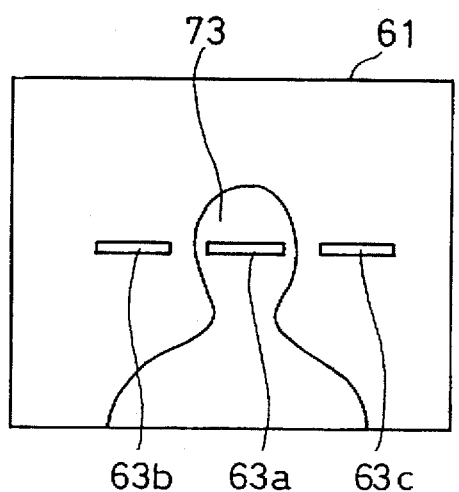

In a conventional AF camera, as noted above with reference to FIG. 11, the object distance and/or defocus amount of the person 73 in the backlit condition cannot be detected when person 73 covers the measuring zone 63a, and the outline of the person 73 is positioned between the measuring zones 63b and 63a and between the measuring zones 63a and 63c. In this case, the object distance or defocus amount of the person 73 cannot be detected since the contrast of the central measuring zone 63a is too low, and the object distance or defocus amount of an object (or objects) situated away from the person 71 is detected on each of the measuring zones 63b and 63c. Consequently, the person 73 will appear blurry in the picture.

In order to give a simple explanation of the construction of the multi-point object distance measuring device of the present invention, the above embodiment shown in FIGS. 8 and 9 is directed to the multi-point object distance measuring device having three measuring zones 15a, 15b and 15c. However, as shown in FIG. 1, 2 or 3, the number of the measuring zones are not limited to three but may be two, four or more than four. Further, the measuring zones need not align in the horizontal direction of the camera, but adjacent measuring zones aligned horizontally or vertically must overlap each other. The width of the overlapping portion of the adjacent measuring zones is preferably between one third and two thirds of the width of a measuring zone, but may be any other width.

In the present embodiment, the image signals integrated by each light receiving element of the line sensors 23L and 23R are first converted to digital signals and then stored in the respective memories. However, an integral calculation may be performed on each measuring zone. In this case, the line sensors 23L and 23R perform the integral calculation for a predetermined period of time in accordance with the brightness of an object to be photographed. Thereafter the object distance or the defocus amount is detected by reading out the integral data from the line sensors 23L and 23R and utilizing only the integral data corresponding to one measuring zone. During this operation, the line sensors 23L and 23R again perform the integral calculation for the predetermined period of time. The object distance or defocus amount is then detected by reading out the integral data from the line sensors 23L and 23R and utilizing only the integral data corresponding to the subsequent measuring zone. The same operation is performed on each of the remaining measuring zones to obtain the object distance or the defocus amount for each of the measuring zones.

In the present embodiment, the multi-point object distance measuring device of the present invention is applied to the lens shutter type camera 41. However, it should be understood that the multi-point object distance measuring device of the present invention may also be applied to an SLR camera, binoculars or other optical devices. In the case of an SLR camera, the light of an object image to be photographed, which has passed through a taking lens and a main mirror and reflected on a sub-mirror, is divided into two bundles of light by means of a light dividing optical element. The two bundles of light are then received by a pair of line sensors similar to those shown in FIG. 4.

In the first, second, and third embodiments shown in FIGS. 1, 2, and 3, respectively, all adjacent object distance measuring zones overlap each other. However, some object distance measuring zones may not overlap an adjacent object distance measuring zone. For example, in the case where there is an additional measuring zone 15d as shown by phantom line in FIG. 2, there are a total of four measuring zones. In the multi-point object distance measuring device of the second embodiment, the measuring zone 15d may be formed separately from the other measuring zones 15a, 15b and 15c as shown in FIG. 2. At least two adjacent measuring zones must overlap each other in the present invention.

Furthermore, in the present embodiment, a pair of line sensors and a pair of image-forming lenses are provided for covering all the sensor areas. However, a pair of line sensors and a pair of image-forming lenses may be provided for each sensor area. For example, in the case of the third embodiment, the pair of line sensors 23L and 23R and the pair of image-forming lenses 21L and 21R may correspond only to the measuring zone 17a. In this case, the range a' shown in FIG. 4 corresponds to the measuring zone 17a. Likewise, the same pairs may be provided for each of the measuring zones 17b through 17e.

As can be seen from the foregoing, according to the present invention, the chance of taking a picture in which the main object is unfocused or blurry is significantly reduced due to the above noted arrangement peculiar to the present invention in which at least two adjacent measuring zones are formed overlapping one another. With this arrangement, even if the main object to be photographed is in the backlit condition, the object distance or defocus amount can be detected since the outline of the main object is placed on at least one of the measuring zones.

We claim:

1. A multi-point object distance measuring device having a plurality of image sensors, comprising:

each of said plurality of image sensors including a plurality of photoelectric converting elements assigned to a plurality of sensor areas corresponding to a plurality of object distance measuring areas; and detecting means for detecting one of amounts of defocus and distances of objects in said plurality of object distance measuring areas, based on output from said plurality of photoelectric converting elements, wherein at least two of said plurality of sensor areas in each of said plurality of image sensors are arranged to be partially overlapping, respectively, such that at least one of said plurality of photo-electric converting elements is common to at least two of said plurality of object distance measuring areas.

2. The multi-point object distance measuring device of claim 1, wherein said plurality of object distance measuring areas are aligned.

3. The multi-point object distance measuring device of claim 1, further comprising:

said plurality of image sensors comprising a pair of image sensors;

a pair of optical elements, each forming an object image corresponding to said plurality of object distance measuring areas upon said pair of image sensors;

a pair of sensor areas on said pair of image sensors, and provided for each of said plurality of object distance measuring areas; and, means for calculating a phase difference of image data obtained by photoelectric-converting object images formed on said pair of sensor areas.

4. The multi-point object distance measuring device of claim 3, wherein said pair of image sensors each comprise a line sensor including a plurality of photoelectric converting elements aligned at predetermined intervals.

5. The multi-point object distance measuring device of claim 4, wherein image data calculated by each of said plurality of photoelectric-converting elements is output from said respective line sensors, photoelectric-converting element by photoelectric-converting element, from one end of said line sensor to the other end.

6. The multi-point object distance measuring device of claim 3, wherein said detecting means includes means for storing said image data output from said pair of image sensors, and wherein said detecting means detects one of amounts of defocus and distances of objects in said plurality of object distance measuring areas by outputting said image data, formed in said sensor areas from said storing means.

7. The multi-point object distance measuring device of claim 3, wherein said detecting means detects one of an amount of defocus and a distance of an object in one of said plurality of object distance measuring areas by using said image data formed in said pair of sensor areas corresponding to said one of said plurality of object distance measuring areas, said image data being output from said pair of image sensors.

8. The multi-point object distance measuring device of claim 3, wherein said detecting means detects one of amounts of defocus and distances of objects in said plurality of object distance measuring areas, object distance measuring area by object distance measuring area, by using said image data formed in said pair of sensor areas, said image data being output from said pair of image sensors.

9. The multi-point object distance measuring device of claim 1, further comprising:

means for forming an object image corresponding to said object distance measuring areas upon each of said plurality of image sensors; and means for calculating a phase difference of object images formed on said plurality of image sensors.

10. The multi-point object distance measuring device of of claim 9, further comprising a pair of image sensors, wherein said pair of sensor areas are formed on said pair of image sensors.

11. The multi-point object distance measuring device of claim 10, wherein said plurality of image sensors each comprise a line sensor, including a plurality of photoelectric-converting elements aligned at predetermined intervals.

12. The multi-point object distance measuring device of claim 11, wherein image data calculated by each of said plurality of photoelectric-converting elements is output from said respective line sensors, photoelectric-converting element by photoelectric-converting element, from one end of said line sensor to the other end.

13. The multi-point object distance measuring device of claim 10, wherein said detecting means includes storing means for storing image data output from said plurality of image sensors, and wherein said detecting means detects one of amounts of defocus and distances of objects in said plurality of object distance measuring areas by outputting said image data, formed in said overlapping sensor areas from said storing means.

14. The multi-point object distance measuring device of claim 10, wherein said detecting means detects one of an amount of defocus and a distance of an object in one of said plurality of object distance measuring areas by using image data formed in said overlapping sensor areas corresponding to said said plurality of object distance measuring areas, said image data being output from said plurality of image sensors.

15. The multi-point object distance measuring device of claim 10, wherein said detecting means detects one of amounts of defocus and distances of objects in said plurality of object distance measuring areas, object distance measuring area by object distance measuring area, by using image data formed in said overlapping sensor areas and output from said plurality of image sensors.

16. A multi-point object distance measuring device, comprising:

first and second line sensors including first and second sets of photoelectric-converting elements, respectively;

said first and second line sensors being assigned to first and second sets of sensor areas corresponding to first and second sets of object distance measuring areas; and means for detecting one of amounts of defocus and distances of objects in said first and second sets of object distance measuring areas by using image data output from said first and second sets of photoelectric-converting elements, wherein at least one of said first set of photoelectric converting elements are commonly used by said detecting means in more than one of said first set of object distance measuring areas, and at least one of said second set of photoelectric-converting elements are commonly used by said detecting means in more than one of said second set of object distance measuring areas.

17. The multi-point focus device of claim 11, wherein each of said plurality of image sensors is provided with said plurality of object distance measuring areas, and at least two of said plurality of object distance measuring areas on each of said plurality of image sensors partially overlap each other.

18. A multi-point focus detecting device, comprising:

an image forming optical system on which light from an object to be photographed is incident, said image forming optical system comprising a pair of image forming lenses, and a pair of line sensors having a predetermined length, each of said pair of line sensors comprising at least two segments;

at least two distance measuring zones through which said light passes toward said image forming optical system, each of said at least two distance measuring zones providing a predetermined distance range such that when said object is in one of said at least two distance measuring zones, a focus detecting operation can be performed, wherein said at least two segments of each of said pair of line sensors including common photocells, and said at least two distance measuring zones are provided in front of said image forming optical system, and overlap partially due to said common photocells.

19. The multi-point focusing detecting device according to claim 18, wherein said image forming optical system is used for said at least two distance measuring zones.

20. The multi-point focus detecting device according to claim 18, wherein said at least two overlapping segments corresponding to said at least two measuring zones.

21. The multi-point focus detecting device according to claim 20, wherein said at least two overlapping segments of each of said line sensors partially overlap to correspond to an overlap in said at least two distance measuring zones.

* * * * *